(12) United States Patent
Parmenter (10) Patent No.: US 6,615,052 B1
(45) Date of Patent: Sep. 2, 2003

(54) RADIO FREQUENCY POWER CONTROL ALGORITHM

(75) Inventor: Kevin C. Parmenter, Overland Park, KS (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/457,751

(22) Filed: Dec. 8, 1999

Related U.S. Application Data
(60) Provisional application No. 60/111,499, filed on Dec. 8, 1998.

(51) Int. Cl.[7] .............................. H04B 7/00; H04B 7/20
(52) U.S. Cl. ...................................... 455/522; 455/13.4
(58) Field of Search ........................... 455/522, 69, 70, 455/13.1, 13.4, 427, 67.1, 12.1, 428, 67.3, 226.1–226.3, 453; 370/318, 317

(56) References Cited

U.S. PATENT DOCUMENTS

| | | | | |
|---|---|---|---|---|
| 5,267,262 A | * | 11/1993 | Wheatley | 375/59 |
| 5,291,147 A | * | 3/1994 | Muurinen | 455/126 |
| 5,832,379 A | * | 11/1998 | Mallinckrodt | 455/427 |
| 5,926,745 A | * | 7/1999 | Threadgill et al. | 455/12.1 |
| 5,943,606 A | * | 8/1999 | Kremm et al. | 342/358 |
| 6,058,306 A | * | 5/2000 | Liu | 342/357.05 |
| 6,085,067 A | * | 7/2000 | Gallagher | 455/13.1 |
| 6,085,107 A | * | 7/2000 | Persson et al. | 455/522 |
| 6,163,679 A | * | 12/2000 | Bakke | 455/12.1 |
| 6,188,678 B1 | * | 2/2001 | Prescott | 370/318 |
| 6,201,961 B1 | * | 3/2001 | Schindall | 455/430 |
| 6,208,835 B1 | * | 3/2001 | Davarian | 455/10 |
| 6,393,005 B1 | * | 5/2002 | Mimura | 370/335 |

FOREIGN PATENT DOCUMENTS

| | | | | |
|---|---|---|---|---|
| EP | 0 359 137 A | | 9/1989 | G06F/13/38 |
| WO | WO 94/28684 | | 12/1994 | H04Q/7/00 |

* cited by examiner

*Primary Examiner*—Dwayne Bost
*Assistant Examiner*—Eliseo Ramos-Feliciano (57) ABSTRACT

The disclosure describes a method and system for dynamically adjusting the output power level in each channel of a multichannel mobile cellular to satellite telecommunication system, the power levels of the voice and data channels being preset to appropriate initial output power levels, the initial power level for data channels being higher than the initial power level for voice channels. The method includes receiving a call request from communication equipment on one of the plurality of channels; determining whether the call is a voice call or a data call, determining whether a transmission channel is available for the call; assigning the call to an available voice or data transmission channel; looking up pre-stored power parameters for each active transmission channel; transmitting the parameters to each active transmission channel via a message; and dynamically adjusting the output power of each active transmission channel in response to the transmitted parameters.

10 Claims, 5 Drawing Sheets

TABLE 400
DATA MAX POWER

NUMBER VOICE CALLS IN PROGRESS

NUMBER DATA CALLS IN PROGRESS

402

404

LOCATION WITHIN TABLE IDENTIFIES NEW POWER SETTING

TABLE 410
DATA MAX POWER

NUMBER VOICE CALLS IN PROGRESS

NUMBER DATA CALLS IN PROGRESS

RADIO FREQUENCY POWER CONTROL
ALGORITHM

This application claims the benefit of U.S. Provisional Application Serial No. 60/111,499, filed in the name of Kevin C. Parmenter on Dec. 8, 1998, the complete disclosure of which is incorporated herein by reference.

FIELD OF THE INVENTION

The present invention relates to radio transceivers having multiple voice and data input/output channels, and in particular to radio frequency power control algorithm for dynamically sharing among the channel transmitters of the available output power.

BACKGROUND OF THE INVENTION

Mobile cellular to satellite communication system radio transceivers having multiple voice and data input/output channels are known. One example of such a mobile cellular to satellite communication system is the AIRSAT® Multi-Channel Satellite Communication System, described in a brochure published October 1997 by AlliedSignal Incorporated, entitled "AIRSAT MULTI-CHANNEL SATELLITE COMMUNICATION SYSTEM for IRIDIUM®," which provides worldwide continuous multichannel voice and data communications for commercial air transport aircraft. Such mobile cellular to satellite communication systems accept data and voice from various sources onboard the aircraft, encode and modulate this information to appropriate Radio Frequency (RF) carrier frequencies, and transmit these carriers to the satellite constellation for relay to the ground. Mobile cellular to satellite communication systems also receive RF signals from the satellite constellation, demodulate these signals, perform the necessary decoding of the encoded messages, and output data or voice for use onboard the aircraft by crew members and passengers.

Figure 1:
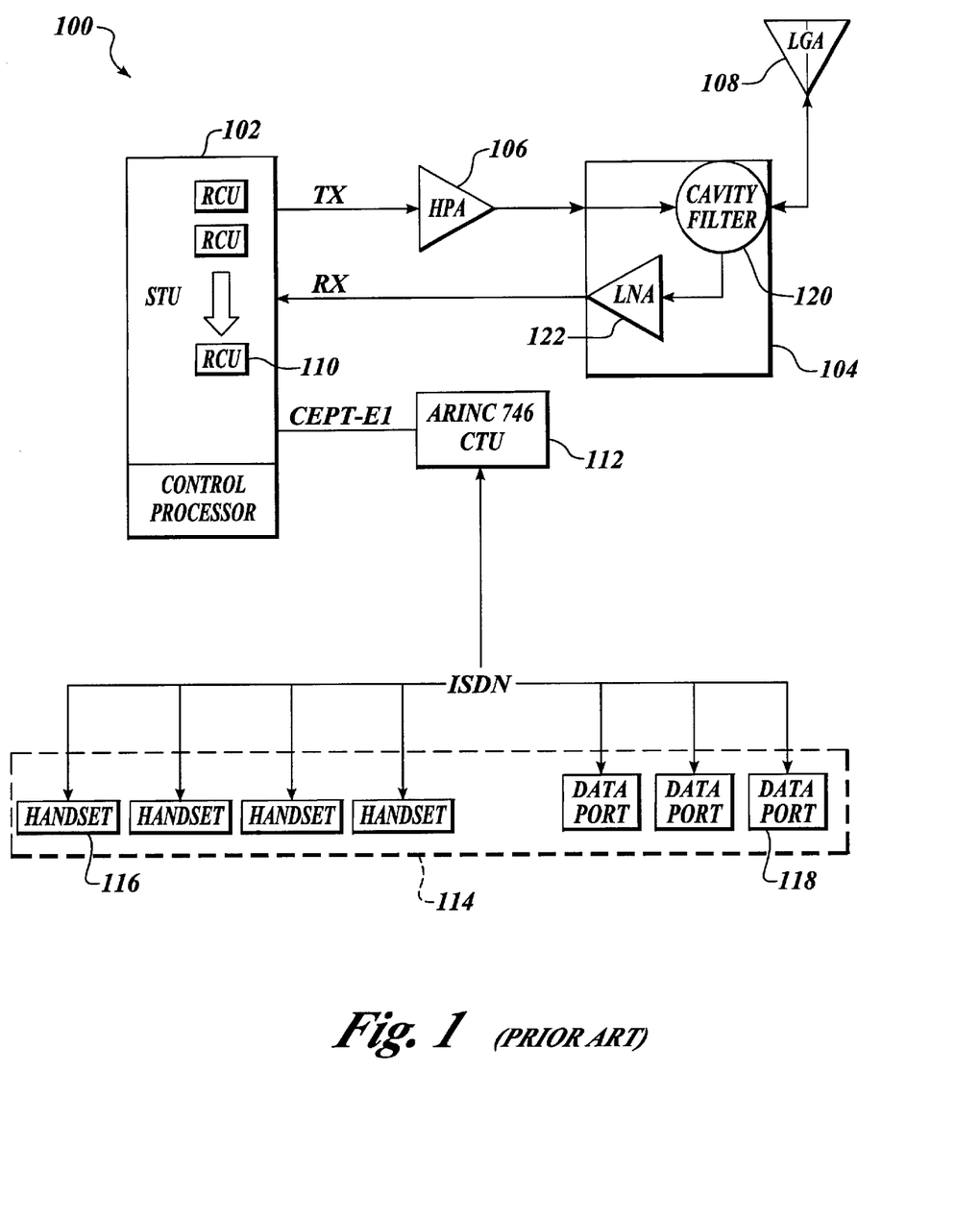
FIG. 1 illustrates a block diagram of one typical implementation of a satellite communication system for commercial air transport aircraft, which provides worldwide continuous multi-channel voice and data communications for commercial air transport aircraft.

FIG. 1 illustrates a block diagram of the avionics forming a specific implementation of the airborne mobile cellular to satellite communication (SatCom) systems equipment 100 of a satellite communication system, which provides worldwide continuous multi-channel voice and data communications for commercial air transport aircraft. Airborne SatCom equipment 100 accepts data and voice input from various sources onboard the aircraft, encodes and modulates this information to appropriate radio frequency (RF) carrier frequencies, and transmits these carriers to the satellite constellation for relay to the ground. The avionics also receives RF signals from the satellite constellation, demodulates these RF signals, performs the necessary decoding of the encoded messages, and outputs data or voice for use on-board the aircraft by crew members and passengers.

The avionics forming one typical implementation of mobile cellular to SatCom equipment 100 for commercial air transport aircraft include, for example, a satellite terminal or telecommunications unit (STU) 102; cavity filter/low noise amplifier (CF/LNA) package 104; a high power amplifier (HPA) 106; and a low gain antenna (ANT) 108. According to at least one implementation of mobile cellular to SatCom equipment 100 for commercial air transport aircraft, each of the avionics are fully compliant with ARINC Characteristic 761, Second Generation Aviation Satellite Communication System, and ARINC Characteristic 746, Cabin Communications System.

In FIG. 1, mobile cellular to SatCom equipment 100 resident on multiple aircraft includes, for example, satellite terminal or telecommunications unit 102, which is essentially a mobile switch, allowing several users, including passengers, flight crew and automated avionics systems, to share the radio channel units (RCUs) 110 contained within satellite telecommunications unit 102. Radio channel units 110 are modular radio units which typically support both voice and data transmissions on the L-Band radio frequency link, including such standard mobile cellular telephone capabilities as voice mail, call forwarding and worldwide messaging, PC data, packet data, and facsimile transmissions, as defined by GSM, the mobile cellular network found throughout Europe, Africa, Asia, and Australia defining the standards governing wireless networks in those territories. A typical satellite telecommunications unit 102 also supports multiple ARINC 429 interface channels. One specific implementation currently provides 7 communication channels: 3 voice channels and 4 data channels. Specific proprietary implementations of satellite telecommunications unit 102 support multiple external interfaces, including, for example, Conference Europeene des Postes et Telecommunications (CEPT-E1) interface to cabin telecommunications unit (CTU) 112 communicating using ARINC Characteristic 746 protocol over a over a high speed serial bus pair interface, which can accommodate multiple digitized voice channels along with status and control information.

Cabin telecommunications unit 112 interfaces with the cabin/passenger telecommunication equipment 114, such as telephone handsets 116 and data ports 118 via in integrated services digital network (ISDN). Cabin telecommunications unit 112 supplies the traditional private branch exchange (PBX) features for the cabin/passenger telecommunication equipment. Cabin telecommunications unit 112 also functions to provide signal processing, i.e., analog-to-digital and digital-to-analog conversion; dial tone generation; call queuing; and providing status messages, such as, "Please hold; your call is being processed."

Cavity filter/low noise amplifier (CF/LNA) package 104 includes cavity filter (CF) 120 and either a low noise amplifier (LNA) or a diplexer low noise amplifier (DLNA) 122, depending upon the specific embodiment. Cavity filter (CF) 120 and low noise amplifier 104 switch the transmit (TX) and receive (RX) paths to low gain antenna 108 from satellite telecommunications unit 102. Low gain antenna 108 also amplifies the receive signal to the level required by satellite telecommunications unit 102. Cavity filter/low noise amplifier circuit 104 insures that the transmit path is isolated from the receive path during the transmit mode to prevent damage to sensitive low noise amplifier 122. High power amplifier 106 receives and amplifies the combined transmitter output power of all active radio channel units 110 and transmits the amplified signals to antenna 108 for transmission to a satellite network for communication. High power amplifier 106 preferably provides an sufficient RF power level to antenna 108 to maintain the aircraft Effective Isolation Radiated Power (EIRP) within specified limits. The design of high power amplifier 106 generally accounts for varying cable losses and avoid excessive thermal dissipation. Antenna 108 is preferably a weight, size and cost-conscious low profile, low gain antenna that provides adequate link margins from all reasonable aircraft orientations and satellite orbits.

The total fixed power level capability of high power amplifier 106 is divided into multiple radio channel units 110. Each radio channel unit 110 includes a transmitter (not shown) that transmits at a fixed power level depending upon the type of communication, voice or data, assigned to an individual radio channel unit 110. FIG. 1 shows a typical division of radio channel units 110 into four voice channels and three data channels. A processor portion of satellite telecommunication unit 102 directs the various voice communications on handsets 116 to one of the four voice radio channel units and directs data communications on data ports 118 to one of the three data radio channel units. As mentioned above, radio channel units 110 are each permanently assigned as either voice or data channels and preset to appropriate output power levels. Both voice and data channels are preset to an appropriate initial output power level, where this initial output power level is determined according to the system requirements necessary to maintain a particular minimum bit error rate (BER) in the specific voice or data link. Voice data can typically tolerate an overall higher BER than can an equivalent data link and remain useful, i.e. intelligible. The overall BER is a function of the power in the channel. Therefore, the initial power level on the data channels is typically higher than on the voice channels to maintain an acceptable BER. Output power is fixed for each voice and data channel and cannot be shared among different radio channel units 110. Lower output power voice signals can be transmitted using data channels, but data transmissions are limited to using only the higher power data channels. Because output power cannot be shared among different radio channel units 110, power from inactive voice channels cannot be added together into a single voice channel to perform data transmissions, thus limiting mobile cellular to SatCom system 100 to a fixed number of data channels. Higher output power data channels can be used to transmit voice, but the output power available to an unused voice channel cannot be diverted to an active voice channel.

Transceivers in such mobile cellular to satellite communication systems include a high power amplifier providing a fixed power output level capability divided into the multiple voice and data input/output channels. While the number of available data and voice channels depends upon the manufacturer's implementation, the available channels are divided into a fixed number of data channels and fixed number of voice channels, each preset to specific output power levels. The power levels for each of the voice and data channels are separate. While the power levels needed for voice and data channels are based on the specific implementation, voice channels require less output power than data channels. Voice transmissions are confined to the human audible frequency range. In contrast, data transmissions, such as facsimile and computer modem transmissions, cover a wider frequency range and, thus, require more output power. Voice transmission, requiring less output power, can be transmitted using the data channels, but data transmissions are limited to using only the higher output power data channels. Nor can power from unused voice channels be added together into a single voice channel to perform data transmissions. Furthermore, the fixed power output capability of the high power amplifier limits the number of transmission channels. Therefore, the mobile cellular to satellite communication system is limited to a preset total number of transmission channels, including a preset number of channels for data transmissions. Although voice can be transmitted using data channels, additional output power in an inactive voice or data channel cannot be diverted to an active voice channel to, for example, increase the volume of the on-going voice transmission.

What is needed is a means for determining the total output power available without violating the integrity of the high power amplifier and dynamically varying the output power available to each channel, such that power usage is optimized.

SUMMARY OF THE INVENTION

The present invention overcomes the limitations of the prior art by providing a multichannel mobile cellular to satellite communication system wherein each channel transmitter dynamically changes its output power based on a message from a control processor. The control processor tracks the number and type of all active calls and adjusts the output power of each channel transmitter to limit the high powered amplifier output power to a range that will not violate its integrity.

According to one aspect of the present invention, a method is provided for dynamically adjusting the radio frequency (RF) output power level in each channel transmitter of a multichannel mobile cellular to satellite telecommunication system having multiple communication devices, such as telephone handsets and data ports, each associated with a different input channel of the multichannel mobile cellular to satellite telecommunication system.

According to one aspect of the present invention, a RF power control algorithm operating on a microprocessor monitors each of several input channels to detect a call request from one of the communication devices. The RF power control algorithm of the invention tracks the activity on each of the channel transmitters via multiple input channels associated with different ones of the transmission channels of the multichannel mobile cellular to satellite telecommunication system. When a call request from one of the communication devices is detected on one of the input channels, the invention determines the availability of the transmission channels and assigns the call to an available one. Preferably, the invention determines the type of call requested, i.e., voice or data, and then calculates adjusted output power parameters for each of the transmission channels. The invention transmits a message containing the parameters to each transmission channel. In response to the parameters in the messages, the satellite telecommunication system dynamically adjusts the output power of each transmission channel.

According to another aspect of the invention, the RF power control algorithm calculates the adjusted output power parameters for each of the transmission channels as a function of the number of active data and voice transmission channels, the minimum power required for each call type based on an allowable bit error rate, and a maximum safe output power of the high power amplifier, whereby the combined adjusted output power of the active transmission channels will not violate its integrity.

According to another aspect of the invention, the availability of ones of the transmission channels is determined either by comparing the number of currently active transmission channels against the maximum number of transmission channels, or by surveying the different channels. If no transmission channel is available, the invention transmits a negative reply to the requesting communication device. However, if a transmission channel is available, the invention automatically initiates a call.

According to still another aspect of the invention, the invention provides a system for dynamically adjusting the output power level in each voice and data transmission channel of a multichannel mobile cellular to satellite telecommunication system. The system of the invention has a memory for storing multiple machine instructions and a processor coupled to the memory and executing the machine instructions to implement multiple functions. The processor includes multiple input and output channels, the input channels associated with different ones of the communication devices, and the output channels associated with different ones of the transmission channels. The functions at least include: receiving a call request signal from communication equipment on one of the processor's input channels; assigning the call to one of the available voice and data transmission channels; calculating new output power parameters for each transmission channel; and transmitting a message containing the new parameters to each transmission channel associated with one of the output channels. The mobile cellular to satellite telecommunication system dynamically adjusts the output power of each transmission channel in response to the new transmitted parameters.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a method and system for dynamically adjusting the output power level in each channel of a multichannel mobile cellular to satellite telecommunication system. The present invention provides a mobile cellular to SatCom system that is not constrained to a preset number of high output power transmissions. Each channel transmitter of the mobile cellular to SatCom system of the present invention can dynamically change its output power based on a message from a control processor. The control processor tracks the number and type, i.e., voice or data, of all calls in progress. Using these parameters, the control processor looks up control parameters in a table, and modifies the output power of each channel transmitter in order to limit the high powered amplifier output power to a range that will not violate its integrity. The control processor uses the parameters in the lookup table to minimize the bit error rate, or BER, based on a maximum allowable BER, while minimizing the channel power. Thus, the control processor uses the parameters in the lookup table to set an initial output power level as a function of the current high power amplifier loading and the power required to achieve a predetermined minimum BER.

Figure 2:
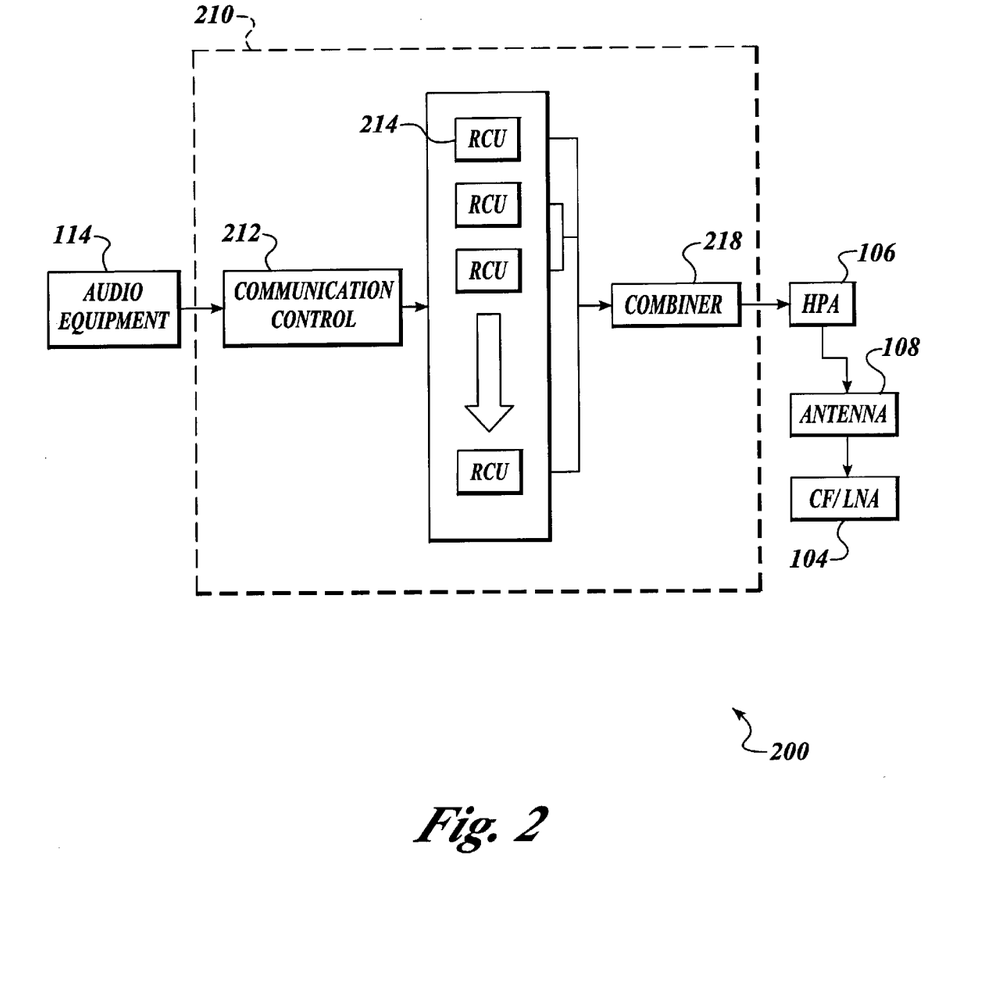
FIG. 2 is a block diagram illustrating one embodiment of the mobile cellular to SatCom system of the present invention, including a satellite telecommunications unit (STU) having a microprocessor operating the algorithm of the invention and the cabin/passenger telecommunication equipment.

FIG. 2 is a block diagram illustrating one embodiment of the mobile cellular to SatCom system 200 of the present invention, including satellite telecommunication unit 210 and the above described interface and cabin/passenger telecommunication equipment 114. Satellite telecommunication unit 210 is preferably configured as a line replaceable unit, or LRU, for ease of replacement, maintenance, and repair. The invention includes a control processor 212 operating software that dynamically adjusts the output power of each channel of multichannel mobile cellular to SatCom system 200. Control processor 212 is, for example, any conventional microprocessor. Control processor 212 is configured having multiple input channels coupled to receive inputs from one or more of telephone handsets 116 and data ports 118 of communication equipment 114, as shown in FIG. 1. Processor 212 also preferably includes multiple output channels, each one coupled to each one of multiple radio channel units 214. Satellite telecommunication unit 210 further includes multiple radio channel units 214, each having a transmitter that transmits at a variable output power level depending upon the type of assigned communication, i.e., voice or data. The transmitter output power of each radio channel unit 214 is output to combiner 218, which outputs the combined transmitter output power to high power amplifier 106 for amplifying signals received from satellite telecommunications unit 210 and transmitting the amplified signals to antenna 108 for transmission to a satellite network.

As described below in FIG. 3, inputs from communication equipment 114 to satellite telecommunications unit 210 automatically initiate a transmission, or call. Satellite telecommunications unit 210 detects a call request from communication equipment 114 and assigns that call to a selected transmitter. The software algorithm embodying the RF power control algorithm of the invention and operating on control processor 212 monitors the input from communication equipment 114, looks up the current transmitter from an embedded memory, adds the new call type to the configuration, and calculates a new set of output power parameters for each transmitter based on the Tables. The Tables, described in detail below, provide for adjustment of the total output power of high power amplifier 106 depending upon the number of active data and voice channels. The table values adjust for power losses in high power amplifier 106, including for example, output/loss and cable loss, as well as other power losses. The algorithm stores the new parameters to memory and transmits the new output power parameters to each transmitter via a message. Each transmitter dynamically changes its output power setting in response to the transmitted message.

Figure 3:
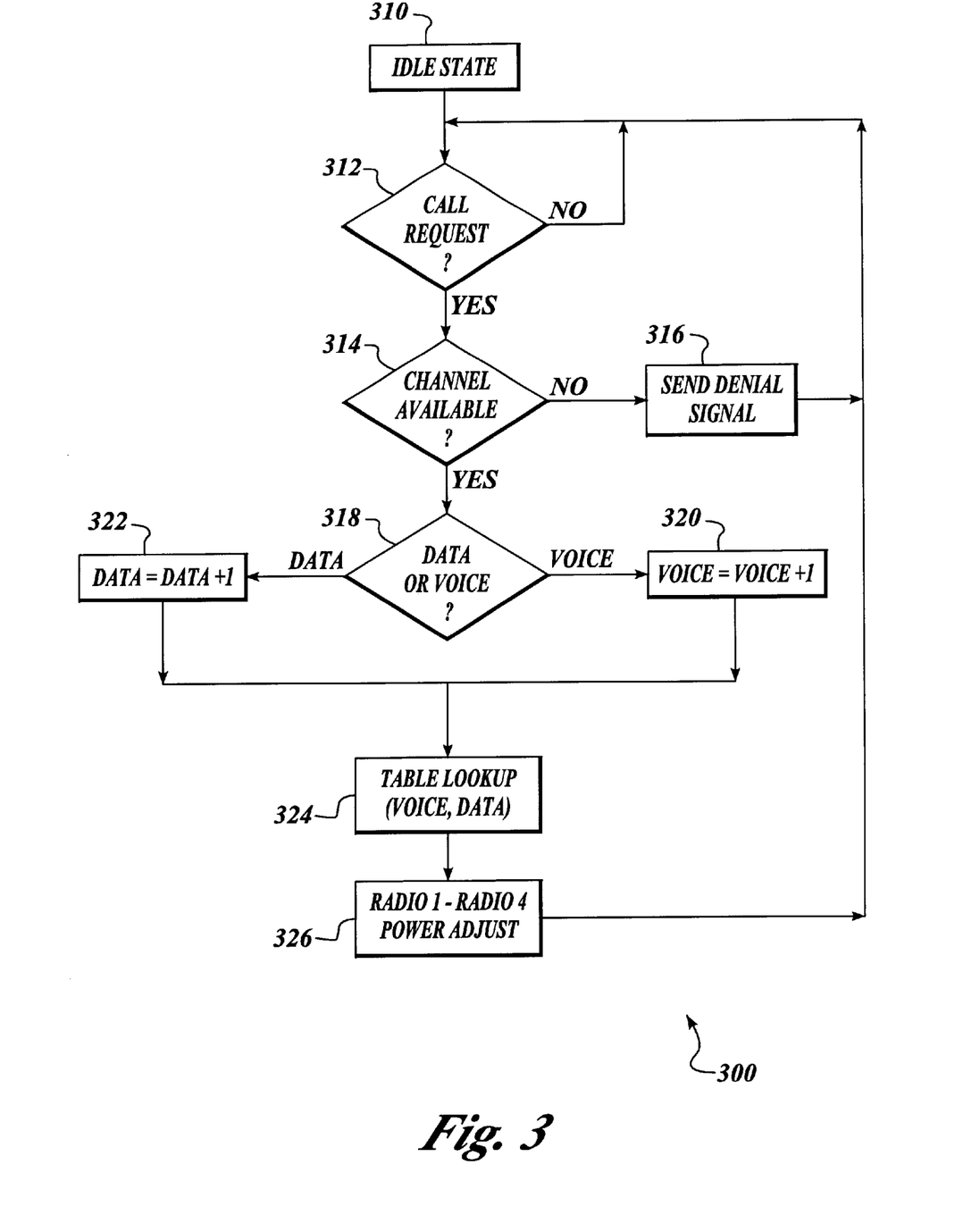
FIG. 3 is a flow chart illustrative of the RF power control algorithm of the invention operating on a microprocessor shown in FIG. 2.

FIG. 3 is a flow chart illustrating the RF power control algorithm of the invention operating on processor 212, shown in FIG. 2. RF power control algorithm 300 of the invention is in an idle state at start-up 310, operating but unoccupied. A call request from one of telephone handsets 116 and data ports 118 of communication equipment 114, shown in FIG. 1, activates RF power control algorithm 300. A call request identifier 312 determines whether a call request has been made. If no call has been requested, algorithm 300 returns to idle state 310 to wait for a call request. If call request identifier 312 determines that a call request has been made, the call request is passed to a function 314 to determine whether a channel is currently available for the call. Channel available function 314 compares the number of currently active channels against the maximum number of channels. Alternatively, channel available function 314 surveys the individual channels to determine whether a channel is currently available for the call. If channel available function 314 determines that no channel is available to transmit the call, a negative reply, or denial signal, is generated and transmitted to the requester via communication equipment 114, and algorithm 300 returns to idle state 310 to wait for a call request. However, if the comparison, or survey, indicates that a channel is currently available, a function 318 determines whether the call request is for a data transmission or a voice transmission. If the call request is for a voice transmission, function 320 increments a voice channel counter by 1. Preferably, the voice channel counter is set to 0 when no voice channels are active. When a voice request is received and a channel is available, the voice channel counter increments from 0 to 1 to indicate that 1 voice channel is now active. Similarly, if a second voice request is received while the first voice channel is still active and another channel is available, the voice channel counter increments from 1 to 2 to indicate that 2 voice channels are now active. At the termination of transmission on any voice channel, the voice channel counter is decreased by 1. If the call request is for a data transmission, a data channel counter function 322 incrementally increases and decreases a data channel counter in similar fashion to voice channel counter 320.

The call request, voice or data, is passed to a table look-up function 324. Table look-up function 324, described in detail below, determines the optimum output power setting for each radio channel unit 214 based on the current quantity of active voice and data channels and passes the information to radio channel unit power adjust function 326. Radio channel unit power adjust function 326 transmits the new parameters to each radio channel unit transmitter via a message. Each transmitter dynamically changes its output power setting in response to the transmitted message.

Figure 4:
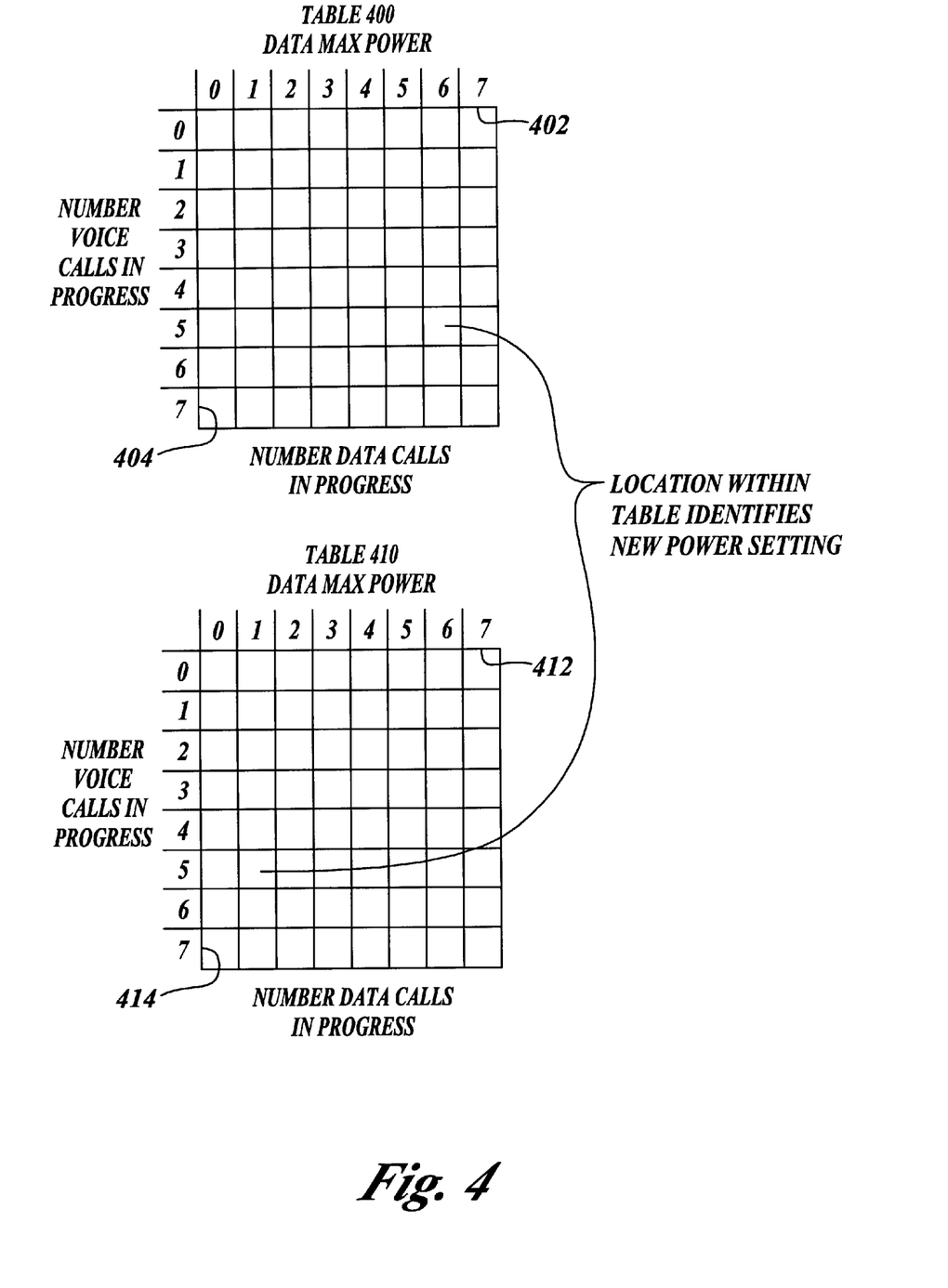
FIG. 4 illustrates the operation of table look-up function whereby the optimum output power setting for each radio channel units (RCU) is determined.

FIG. 4 illustrates the operation of table look-up function 324 whereby RF power control algorithm 300 determines the optimum output power setting for each radio channel unit 214. Two look-up Tables 400 and 410 are stored in memory. Tables 400 and 410 optimize output power for voice and data channels based on bit error rate and high power amplifier efficiency. First look-up Table 400 determines the maximum output power available for data transmissions. Table 400 is a two dimensional array of active data and voice channels. The number of active data channels is measured along the ordinate 402, while the number of active voice channels is measured along the abscissa 404. Second look-up Table 410 laid out in similar fashion determines the maximum output power available for voice transmissions. In Table 410 the number of active data channels is again measured along the ordinate 412, while the number of active voice channels is again measured along the abscissa 414. Locations within the table identify the optimum power setting for each voice and data channel based on the number of currently active voice and data channels. The output power is preferably in the form of a dB value or watts for both data and voice channels. All the active channels are reset to new output power levels based on the values determined by Tables 400, 410. Although Tables 400, 410 are variable depending upon the specific design of high power amplifier 106, the cable losses between satellite telecommunication unit 210 and high power amplifier 106, and other installation considerations, such changes are considered to be within the skill of one or ordinary skill in the art to determine without undue experimentation.

In an example of the operation of table look-up function 324, assume that the maximum RF power output available from high power amplifier 106 without system integrity issues is 100 watts and that the maximum RF power output of each data channel transmitter is twice, or 2x, that of each voice channel transmitter. Each time satellite telecommunications unit 210 detects a call request from communication equipment 114 and assigns that call to a selected transmitter, the number of active voice and data channels is sent to processor 212, which controls the distribution of power among the active channels. Processor 212 automatically updates the attenuator for data and the attenuator for voice to limit the output power of high power amplifier 106 to the maximum operating value. Processor 212 is able to step up or down from the maximum attenuator values based on the Link Quality Indicator (LQI) from the space vehicle (SV), or satellite. The LQI is a dynamic feedback from the satellite to the onboard mobile cellular unit 200 indicating the quality of the current link, which correlates to the BER. The LQI is used to dynamically adjust the power outputs of the high power amplifier such that an optimum balance is maintained between a minimum power level, or usage, and an acceptably low BER. For example, a LQI signal indicating a lower than necessary BER causes the power output to be reduced to optimize both BER and power consumption. In contrast, a LQI signal indicating a higher than acceptable BER causes the power output to be increased to the extent that the limit of high power amplifier 106 is not exceeded. Thus, the RF power control algorithm of the invention provides a 2-level attenuator algorithm, which guarantees that the maximum output power of high power amplifier 106 is never violated. The RF power control algorithm also avoids any extra hardware between radio channel units 214 and high power amplifier 106 to attenuate the channel output power further to avoid damage to high power amplifier 106.

Figure 5:
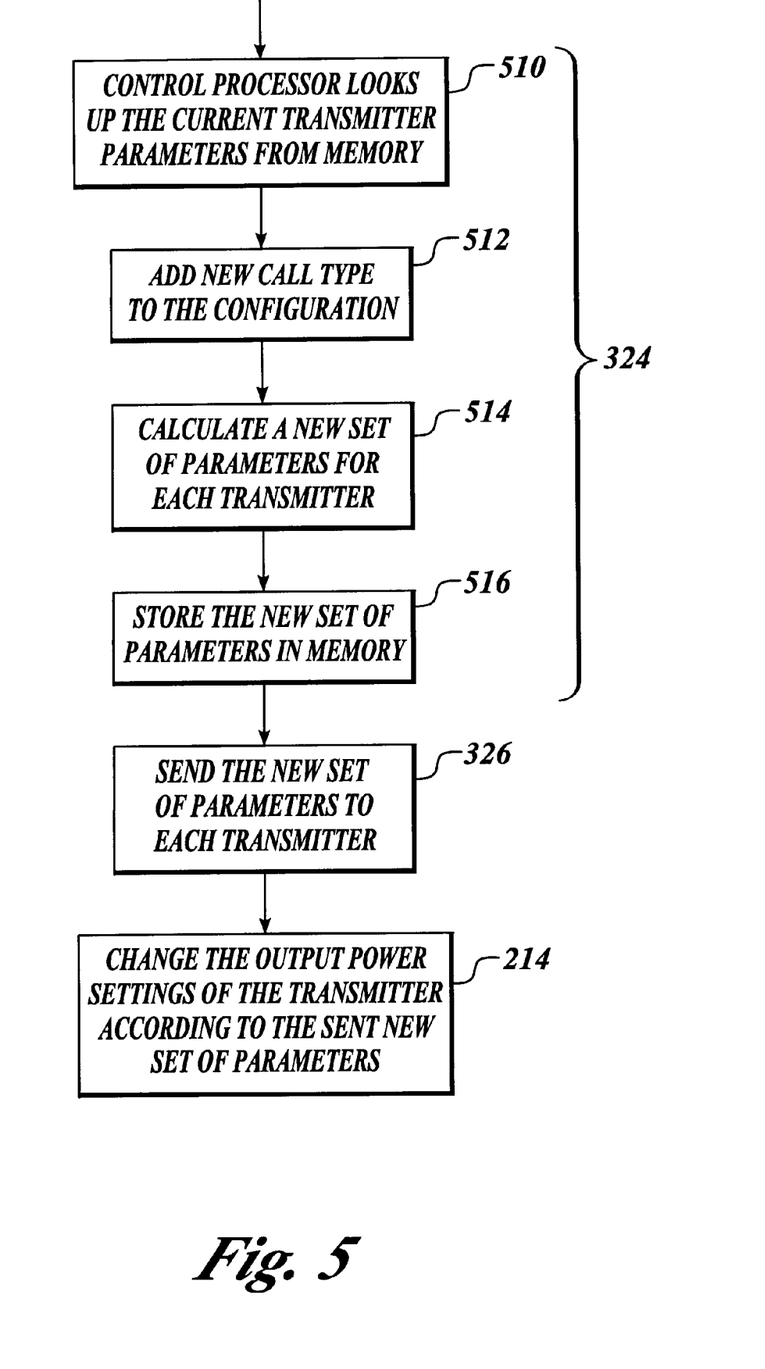
FIG. 5 is a flow chart illustration of table look-up function described in FIG. 4.

FIG. 5 is a flow chart illustration of table look-up function 324. In Function Block 510, control processor 212 enters the embedded memory and looks-up the current transmitter parameters. In Function Block 512, the call type of the most recent call, either voice or data, is added to the current configuration. A new set of parameters are calculated for each transmitter in Function Block 514 and these new parameters are stored in memory in Function Block 516. Function Block 516 transmits the new parameter information to radio channel unit power adjust function 326. As mentioned above, radio channel unit power adjust function 326 transmits the new parameters to each radio channel unit 214 transmitter via a message, and each radio channel unit 214 transmitter dynamically changes its output power setting in response to the transmitted message.

While the preferred embodiment of the invention has been illustrated and described, it will be appreciated that various changes can be made therein without departing from the spirit and scope of the invention. For example, those of ordinary skill in the art will recognize that the storage of transmitter information can be implemented by various other means without exceeding the scope of the invention. Those of ordinary skill in the art will further recognize that the transfer of the new parameters to the transmitters also can be implemented by various other means without exceeding the scope of the invention.

What is claimed is:

1. A method for dynamically adjusting the output power level in each active voice and data transmission channel of a multichannel mobile cellular to satellite communication system, the power levels of the voice and data channels being preset to appropriate initial output power levels, the initial power level for data channels being higher than the initial power level for voice channels, said method comprising the steps of:

receiving a call request from communication equipment on one of the plurality of channels;

determining for said call request whether the call is a voice call or a data call;

determining whether a transmission channel is available for said call;

assigning said call to an available voice or data transmission channel;

looking up pre-stored power parameters for each active transmission channel, wherein looking up prestored output power parameters for each of said active transmission channels comprises looking up of parameters based upon a number of active data and voice transmission channels, a minimum power required for each call type based upon an allowable bit error rate, and a maximum safe output power of a high power amplifier;

transmitting said parameters to each said active transmission channel via a message; and dynamically adjusting the output power of each said active transmission channel in response to said transmitted parameters, whereby a combined adjusted output power of the active transmission channels will not violate the integrity of the amplifier.

2. The method recited in claim 1, further comprising monitoring said communication equipment and automatically initiating a call in response to said receiving a call request.

3. The method recited in claim 1, further comprising incrementing a respective one of a voice channel counter and a data channel counter in response to said determining whether said call is a voice call or a data call.

4. The method recited in claim 1, wherein said looking up of output power parameters for each said transmission channel further comprises pre-storing output power parameters having an output power sum limited by a maximum output power of said high power amplifier amplifying signals received from said transmission channels and transmitting said amplified signals to an antenna for transmission to a satellite network for communication.

5. The method recited in claim 1, wherein said adjusting the output power of said transmission channels is a function of the number of active data and voice transmission channels.

6. The method as recited in claim 1, wherein said step of determining availability of ones of the transmission channels comprises comparing the number of currently available active transmission channels against the maximum number of transmission channels.

7. The method recited in claim 1, further comprising storing said calculated output power parameters for each active transmission channel in a memory.

8. The method recited in claim 1, wherein the total output power of all the active transmission channels is combined in a high power amplifier amplifying the transmission signals and transmitting the amplified transmission signals to an antenna for transmission to a satellite network for communication.

9. The method recited in claim 8, wherein said step of looking up output power parameters for each of the transmission channels further comprises looking up said adjusted output power parameters as functions of number of active data and voice transmission channels and a maximum safe output power of the high power amplifier.

10. A method for dynamically adjusting the output power level in each active voice and data transmission channel of a multichannel mobile cellular to satellite communication system, the power levels of the voice and data channels being preset to appropriate initial output power levels, the initial power level for data channels being higher than the initial power level for voice channels, said method comprising the steps of:

receiving a call request from communication equipment on one of the plurality of channels;

determining for said call request whether the call is a voice call or a data call, determining whether a transmission channel is available for said call;

assigning said call to an available voice or data transmission channel;

looking up pre-stored power parameters for each active transmission channel;

transmitting said parameters to each said active transmission channel via a message; and dynamically adjusting the output power of each said active transmission channel in response to said transmitted parameters.

* * * * *